United States Patent [19]

Richter

[11] Patent Number: 4,752,168
[45] Date of Patent: Jun. 21, 1988

[54] EXPANSION DOWEL ASSEMBLY

[75] Inventor: Hanno Richter, Unterhaching, Fed. Rep. of Germany

[73] Assignee: Hilti Aktiengesellschaft, Liechtenstein

[21] Appl. No.: 810,641

[22] Filed: Dec. 18, 1985

[30] Foreign Application Priority Data

Dec. 20, 1984 [DE] Fed. Rep. of Germany ....... 3446516

[51] Int. Cl.⁴ ............................................. F16B 13/04
[52] U.S. Cl. ........................................ 411/38; 411/55
[58] Field of Search ...................... 411/34–38, 411/41, 43, 55

[56] References Cited

U.S. PATENT DOCUMENTS

| | | | |
|---|---|---|---|
| 1,881,973 | 10/1932 | Schmitt | 411/38 |
| 2,236,079 | 3/1941 | Wipper | 411/38 |
| 2,397,111 | 3/1946 | Huck | 411/43 |
| 2,409,352 | 10/1946 | Gill | 411/38 |
| 2,559,281 | 7/1951 | Croessant | 411/38 |
| 2,964,989 | 12/1960 | Croessant | 411/38 |
| 3,143,916 | 8/1964 | Rice | 411/37 |
| 3,253,495 | 5/1966 | Orloff | 411/34 |
| 3,888,156 | 6/1975 | Fima | 411/38 |
| 3,916,970 | 11/1975 | Dwens | 411/34 |
| 4,269,106 | 5/1981 | Leibhard et al. | 411/34 |
| 4,289,062 | 9/1981 | Schiefer | 411/34 |
| 4,312,613 | 1/1982 | Binns | 411/34 |
| 4,364,697 | 12/1982 | Binns | 411/38 |
| 4,457,652 | 7/1984 | Pratt | 411/38 |

FOREIGN PATENT DOCUMENTS 212600 7/1956 Australia ............................... 411/38

Primary Examiner—Neill Wilson
Attorney, Agent, or Firm—Toren, McGeady

[57] ABSTRACT

An expansion dowel assembly includes an axially elongated dowel member with a flange at one end and arms extending from the flange to a junction member at the other end. By applying a force at the junction member and pulling it toward the flange, the arms can be buckled or displaced radially outwardly and collapsed in the axial direction. An abutment member is provided in the dowel for limiting the extent of axial collapsibility. The abutment member can be an axially extending sleeve member or an enlarged diameter part of a force applying member extending through the dowel member.

2 Claims, 1 Drawing Sheet

EXPANSION DOWEL ASSEMBLY

BACKGROUND OF THE INVENTION

The present invention is directed to an expansion dowel assembly for securement in thin-walled structural components with the assembly including a dowel member having elongated arms which buckle radially outwardly when the dowel member is collapsed in the axial direction. A flange is located at one end of the arms and the arms are interconnected at the other end by junction member. Force applying means can be arranged at the junction member for effecting the axial collapse of the dowel member.

For providing an attachment to thin-walled structural components accessible only from one side, such as plates or hollow receiving materials, so-called cavity dowels are used. To effect anchoring such dowels are introduced into a receiving bore or opening until the abutment of a flange on the dowel contacts the surface of the receiving material. The dowel is dimensioned so that the larger portion of its length extends through the receiving material and into a cavity or hollow space behind the material. Subsequently, the dowel is collapsed in the axial direction such as by a special tool or a threaded bolt, so that expansion arms forming the dowel buckle radially outwardly and grip behind the receiving material. The extent of this collapsing operation is not visible from the exterior, accordingly, certain inferences must be drawn with regard to the anchored state of the dowel based on the increase in resistance to its deformation.

When the above-mentioned expansion dowel is used in soft receiving materials, such as plastics or the like, it has been noted that an overexpansion of the dowel is possible, which may result in damage to the receiving material and the dowel. Usually such damage is not recognizable from the exterior and, therefore, can lead to failure when a load is applied to the dowel

SUMMARY OF THE INVENTION

The primary object of the present invention is to provide an expansion dowel assembly in which overexpansion, for instance when the dowel assembly is used in a soft receiving material, does not occur.

In accordance with the present invention an abutment member is provided in the dowel assembly which limits the extent to which the assembly can be collapsed in the axial direction.

Such an abutment member incorporated in the dowel assembly limits the deformation of the dowel and prevents unnecessary collapse of the dowel in the event excessive forces are applied to it. By the selection of appropriate abutment members, the same dowel assembly can be used in receiving materials of different thicknesses.

Basically, there are a number of different ways for limiting the deformation of the dowel assembly. For a compact arrangement of the expansion dowel assembly, it is appropriate to locate the abutment member in between the expansion arms. Such an abutment member positioned between the expansion arms does not project radially beyond the arms and thus does not require a larger opening or borehole diameter than for a corresponding expansion dowel without such an abutment member. During the expansion or collapse of the dowel, relatively high forces are developed. To avoid deformation of the abutment member it is advantageous to locate the abutment member between the flange and the point where force is applied to the dowel for effecting its collapse. Since in effecting the expansion or collapse of the dowel, the flange and the point of applying force are displaced axially of one another, a compressive force is applied against the abutment member located between the two points. Accordingly, it is possible to provide a relatively small abutment member.

When the dowel is collapsed in the axial direction, the expansion arms are displaced or buckle radially outwardly. As a result, the axial load carrying ability of the dowel increases initially. The axially extending halves of the expansion arms connected to one another at the point where the arms buckle outwardly, mutually support one another. If the expansion arms are deformed excessively, the arms halves assume a flat abutting condition and can be easily bent over. When this occurs, the receiving material can also be damaged. To avoid such an occurrence, it is preferable if the abutment member extends for approximately half of the distance between the flange and the point where the collapsing force is applied to the expansion arms. When the abutment member is dimensioned in this manner, and the dowel is expanded or collapsed, an intermediate angle of approximately 20° to 40° is formed between the two halves of tne expansion arms and an optimum anchorage of the dowel in the receiving material is effected.

The abutment member can be a component of the dowel or a separate part to be used in combination with the dowel. To avoid any problems and for reasons of production, it is preferable to connect the abutment member with the flange. Such connection can be made by welding, soldering or bonding. It is particularly economical if the abutment member forms an integral component with the flange. In such an arrangement the abutment member and the flange can be formed from the same material and practically without additional machining steps.

For ease in fabrication, the abutment member can be formed as a sleeve-shaped part with the inside diameter of the sleeve-shaped part corresponding approximately to that of the flange. A sleeve-shaped abutment member is not affected by its position with regard to the dowel body, that is, it can be located in any axial position within the dowel or it can be connected directly to the dowel.

The expansion of the dowel assembly by means of axial collapse can be effected by a separate installation tool or by an attachment member connectible to or connected with the dowel. The installation tool can be an arbor connectible with engagement means on the dowel for applying the collapsing force or it can be a tension bolt extending through and connected to the dowel. The attachment element can be a threaded bolt to be screwed into an inside thread on the dowel or a nut to be attached onto a threaded bolt connected with the dowel. If the inside diameter of the abutment member corresponds to the inside diameter of the flange, the diameter of the arbor or bolt is not limited by the abutment member. Accordingly, the same installation tool or part can be used for a dowel of a specific dimension with the abutment member as well as for a corresponding dowel without an abutment member. Such a feature considerably simplifies the use of the expansion dowel assembly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
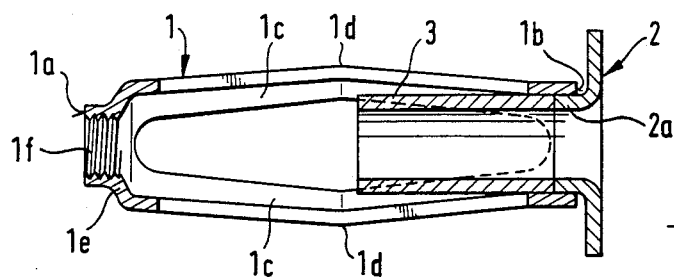
FIG. 1 is an axially extending sectional view of an embodiment of an expansion dowel assembly embodying the present invention and shown in the unexpanded state.

In FIG. 1 an expansion dowel assembly is illustrated including an axially elongated dowel member 1 with a leading end 1a at the left end, that is, the end which is inserted first into a receiving material, and a trailing end 1b at the right end. Extending between the leading end 1a and the trailing end 1b of the dowel member 1 are a number of expansion arms 1c which can be displaced radially outwardly under an axial collapsing action with each arm having a collapsing or buckling location 1d located approximately midway between its ends. A junction member 1e is located at the leading end 1a and interconnects the expansion arms. The junction member 1e is provided with an inside thread 1f so that an axial force applying member can be secured to the hollow dowel member 1. At its trailing end 1b, the dowel member 1 has a flange 2. The flange 2 has a short tube-like section 2a extending into the trailing end of the dowel member 1 and a flange-like part extending radially outwardly. A sleeve-shaped abutment member 3 is located within the dowel member 1. The abutment member 3 limits the axial collapse of the dowel member 1 and, accordingly, the extent of radial deformation or buckling of the arms 1c. Abutment 3 is connected with the tube-like section 2a of the flange or with the dowel member 1 by welding, soldering or bonding. The inside diameter of the abutment member 3 corresponds approximately to the inside diameter of the tube-like section 2a of the flange 2. To effect the outward displacement or expansion of the dowel member, a tool, not shown, but equipped with a thread corresponding to the inside thread 1f in the junction member 1e can be inserted through the flange 2 and the abutment member 3 into engagement with the inside thread 1f. When a tensile or pulling force is applied to the tool, pulling the junction member 1e at the leading end 1a toward the trailing end 1b, the dowel member is collapsed in the axial direction with the arms 1c expanding radially outwardly for effecting an anchorage.

Figure 2:
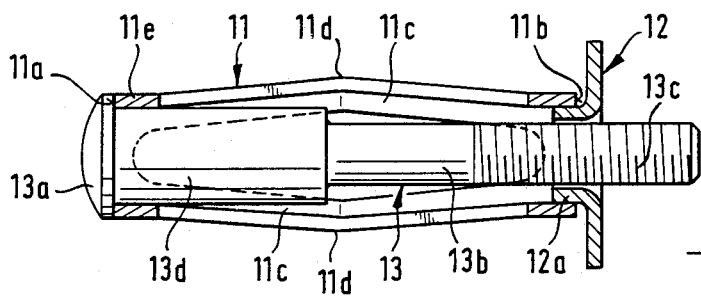
FIG. 2 is a view similar to FIG. 1 of another embodiment of the present invention.

In FIG. 2 another expansion dowel assembly embodying the present invention is displayed including a dowel body 11 with a leading end 11a and a trailing end 11b. Expansion arms 11c extend in the axial direction of the dowel member between the leading end 11a and the trailing end 11b and the arms have a buckling or collapsing position 11d approximately at the halfway point in the axial direction. At the leading end 11a the expansion arms 11b are interconnected by an annular junction member 11e. At the trailing end 11b, the dowel member is connected with a flange 12. Flange 12 includes a short tube-like section 12a extending into the trailing end of the dowel member 11. A tensile bolt 13 extends through the hollow dowel body 11 from the leading end to the trailing end. Bolt 13 includes a head 13a bearing against the junction member 11e at the leading end and a shank 13b extending from the head through the flange 12 at the trailing end. At its trailing end, the bolt 13 has a thread 13c. The shank 13b has a diametrically enlarged axially extending section forming an abutment member 13d. If a tensile load or force is applied at the thread 13c, the head 13a of the bolt 13 bearing against the leading end of the dowel member 11 causes the dowel member to collapse in the axial direction with a corresponding radially outward buckling of the expansion arms 11c. This collapsing action is limited by the contact of the abutment member 13d with the end of the tube-like section 12a facing toward the leading end of the dowel member.

Figure 3:
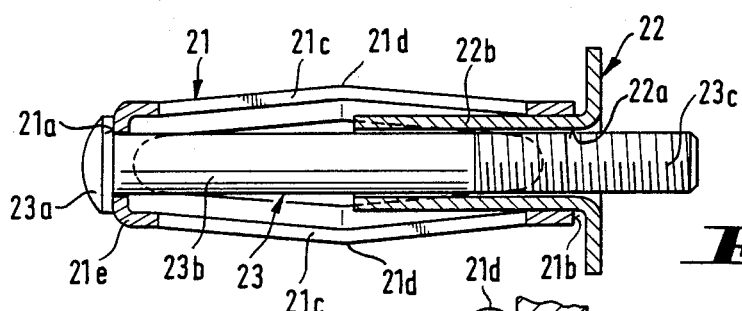
FIG. 3 is a view similar to FIGS. 1 and 2 displaying a third embodiment of the present invention.
Figure 4:
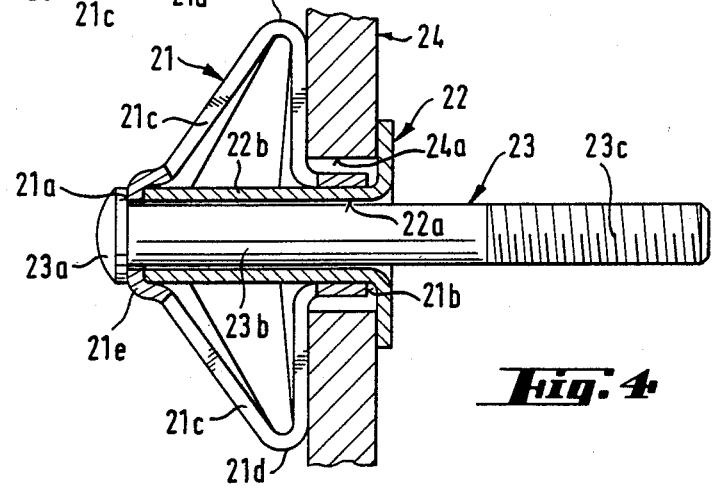
FIG. 4 displays the dowel assembly set forth in FIG. 3 in the anchored or collapsed state.

In FIGS. 3 and 4 an expansion dowel assembly is exhibited including a dowel member 21 with a flange 22 located at the trailing end. The dowel member 21 has a leading end 21a and a trailing end 21b. Expansion arms 21c extend between the leading end and the trailing end of the dowel member and the arms are arranged to buckle radial outwardly under an axial collapsing action of the dowel member. The expansion arms 21c have a buckling location 21d approximately halfway between the leading end and the trailing end and the arms are interconnected at the leading end by a junction member 21e. The flange 22 includes an axially extending tube-like part forming an abutment member 22b with the abutment member forming a bore 22a. The abutment member is formed monolithically with the radially outwardly extending flange. An axially extending tension bolt 23 extends completely through the dowel member from the leading end to the trailing end. Bolt 23 has a head 23a bearing against the leading end 21a of the dowel member 21 and a shank 23b extending from the head and passing through the bore 22a formed by the abutment member 22b with a thread 23c extending out of the trailing end of the dowel member.

In FIG. 4 the expansion dowel assembly has been inserted through an opening 24a in a thin-walled structure 24 and a pulling force has been applied through the bolt 23 so that the dowel member 21 has been collapsed in the axial direction with its expansion arms 21c buckling radially outwardly at the location 21d. The radial buckling and the axial collapse of the expansion arms 21c of the dowel member 21 is limited by the contact of the abutment member 22b with the junction member 21e inwardly of the bolthead 23a. As a result, the expansion arms 21c assume an angular configuration.

While specific embodiments of the invention have been shown and described in detail to illustrate the application of the inventive principles, it will be understood that the invention may be embodied otherwise without departing from such principles.

I claim:

1. Expansion dowel assembly to be used in a thin-walled structural component, said assembly comprises an axially elongated dowel member having a leading end which is inserted first when said dowel member is placed into a structural component and a trailing end spaced from the leading end in the axial direction thereof, said dowel member being hollow between the leading and trailing ends thereof and comprising a plurality of laterally spaced elongated expansion arms extending as unitary members between the trailing and leading ends and being radially outwardly displaceable and being collapsible in an axial direction, said dowel member comprises a radially outwardly extending flange at the trailing end thereof and a junction member at the leading end thereof interconnecting said arms, means at said junction member for applying a force for radially displacing and axially collapsing said arms, wherein the improvement comprises said expansion arms form an axially extending annular wall with axially extending openings between its arms and the arms are generally flat thin wall members and are in spaced relation to one another from adjacent the trailing end to the junction member, said arms define an axially extending passage for the axial length thereof fully open radially inwardly of said arms, said expansion arms have a buckling location located approximately midway between the leading and trailing ends of said dowel member, said flange is an annular member, an abutment member for providing a positive stop of the axial collapsibility of said arms after a predetermined axial collapse has taken place, said abutment member is located within the passage formed by said arms in said hollow dowel member radially inwardly of and separate from said arms, said abutment member is connected to and extends in the axial direction of said dowel member from said flange toward said junction member for approximately half of the axial direction between said flange and said junction member, said abutment member is a tube-shaped section extending in the axial direction of said dowel member from said flange and having an inside diameter for the axial length thereof, said flange having an inside diameter corresponding approximately to the inside diameter of said abutment member, the opposite end of said abutment member from said flange forms the position stop, said junction member is a thin wall member and includes an annular thin wall section extending transversely of the axial direction of said dowel member with said thin wall section having an opening therethrough in the axial direction of said dowel member with a diameter corresponding approximately to the inside diameter of said abutment member, the surface of said thin wall section facing toward the trailing end of said dowel member contacts the opposite end of said abutment member providing the position stop for the axial collapsibility of said arms.

2. Expansion dowel assembly, as set forth in claim 1, including an axially elongated bolt extending through said dowel member from the leading end to the trailing end thereof, said bolt having a head at one end thereof arranged to bear against a surface on said junction member located at the leading end of said dowel member facing outwardly, and an axially extending shank extending from said head through the trailing end of said dowel member and extending through said abutment member.

* * * * *